United States Patent [19]

Weitz et al.

[11] 4,379,756
[45] Apr. 12, 1983

[54] REACTIVATION OF SUPPORTED CATALYSTS WHICH CONTAIN PALLADIUM, COPPER AND TELLURIUM

[75] Inventors: Hans-Martin Weitz, Bad Durkheim; Rolf Fischer, Heidelberg, both of Fed. Rep. of Germany

[73] Assignee: BASF Aktiengesellschaft, Ludwigshafen, Fed. Rep. of Germany

[21] Appl. No.: 261,277

[22] Filed: May 6, 1981

[30] Foreign Application Priority Data

Jun. 12, 1980 [DE] Fed. Rep. of Germany ....... 3022043

[51] Int. Cl.³ .................... B01J 37/00; B01J 27/02
[52] U.S. Cl. .................... 252/411 R; 252/439
[58] Field of Search ............. 252/439, 411 R

[56] References Cited

U.S. PATENT DOCUMENTS

3,578,608  5/1971  Aykan .............. 252/411 R

FOREIGN PATENT DOCUMENTS

2943407  of 1980  Fed. Rep. of Germany .
53-39283  of 1978  Japan ................... 252/439
54-9992   of 1979  Japan .
54-9993   of 1979  Japan .

*Primary Examiner*—Delbert E. Gantz
*Assistant Examiner*—William G. Wright
*Attorney, Agent, or Firm*—John H. Shurtleff

[57] ABSTRACT

A process for reactivating supported catalysts which contain palladium, copper and tellurium and which are used for the acyloxylation of unsubstituted or substituted butadiene to give butenediol esters, wherein the supported catalysts are heated at from 200° to 900° C. in the presence of a gas which is inert under these treatment conditions.

10 Claims, No Drawings

REACTIVATION OF SUPPORTED CATALYSTS WHICH CONTAIN PALLADIUM, COPPER AND TELLURIUM

The present invention relates to a process for reactivating supported catalysts which contain palladium, copper and tellurium and which are used for the acyloxylation of unsubstituted or substituted butadiene to give butenediol esters.

Butenediol esters, such as 1,4-diacetoxy-but-2-ene, are valuable intermediates, for example for the preparation of butene-1,4-diol, butane-1,4-diol and tetrahydrofuran. Butene-3,4-diol diacetate (vinylglycol diacetate) is a useful intermediate for the preparation of vitamins and other biologically active compounds, and 2-methyl-1,4-diacetoxy-but-2-enes and 1,1,4-triacetoxy-2-methyl-but-2-enes are valuable intermediates, for example for the synthesis of terpene compounds. As is well-known, these butendiol esters may be prepared by, for example, catalytically acetoxylating butadiene or isoprene.

Japanese Published Application No. 9,993 (1979) discloses that catalysts which are useful for such acetoxylations and which contain palladium and tellurium on active charcoal can be reactivated by treating the reduced-activity catalyst with hydrogen at 300°–600° C. A similar effect is achieved if the reduced-activity catalyst is first treated with hydrogen at 300°–600° C., then with oxygen at 150°–350° C., and lastly again with hydrogen at 300°–600° C. (Japanese Published Application No. 9,992 (1979)).

In carrying out this activation process industrially, considerable problems, in particular in respect of work safety, arise due to the aggressiveness of hydrogen at these temperatures, which can, for example, cause embrittlement of the metals used to construct the reaction vessels.

We have found that supported catalysts which contain palladium, copper and tellurium and which are used for the acyloxylation of unsubstituted or substituted butadiene to give butenediol esters, can advantageously be reactivated by heating them at from 200° to 900° C. in the presence of a gas which is inert under these treatment conditions.

Supported catalysts which contain palladium or platinum, and additionally contain copper and tellurium, and which can be reactivated in accordance with the present invention, are described, for example, in German Laid-Open Application DOS No. 2,943,407, corresponding to the U.S. application, Ser. No. 195,757, filed Oct. 10, 1980. Catalysts of this type for example contain from 1 to 10% of palladium or platinum, from 0.1 to 30% of copper and from 0.01 to 10% of tellurium, based on weight of catalyst. Amongst them, supported catalysts which contain from 0.01 to 6, preferably from 1 to 3.5, gram atoms of copper and from 0.01 to 1, preferably from 0.01 to 0.4, gram atom of tellurium per gram atom of palladium or platinum, and in which intermetallic phases having the composition $PdCu_3$, $PtCu_3$, $PdCu$ or $PtCu$ are detectable by X-ray methods are preferred.

In these catalysts, the total amount of catalytically active metals applied to the carriers is, for example, from 0.01 to 30% by weight, based on supported catalyst. Suitable carriers are, for example, active charcoal, bauxite, pumice, silica gel, kieselguhr or other forms of silica, magnesia, clay and alumina.

The supported catalysts, containing palladium, copper and tellurium, are used for the acyloxylation of butadiene, substituted 1,3-dienes, e.g. isoprene and 2,3-dimethyl-1,3-butadiene, 1,3-pentadienes, e.g. piperylene, or acyloxy-substituted 1,3-butadienes, e.g. 1-acetoxy-butadiene, 1-acetoxy-2-methyl-1,3-butadiene or 1-acetoxy-3-methyl-1,3-butadiene. The said diolefins may be employed individually or as mixtures, which can also additionally contain, for example, other hydrocarbons, such as monoolefins and paraffin hydrocarbons. Such mixtures are available as, for example, $C_4$-cuts. The acyloxylation is carried out in a conventional manner by treating the diene, in the gaseous or liquid phase, in the presence of the cataylst, with oxygen and a low molecular weight carboxylic acid, e.g. formic acid, acetic acid or propionic acid, at from 70° to 180° C.

The reaction pressure depends on the procedure employed and can be from atmospheric pressure to, for example, 100 bar. The acyloxylation is carried out batchwise or continuously, for example using a fixed bed, fluidized bed or three-phase fluidized bed.

On an industrial scale, the reactivation, according to the invention, of the supported catalysts, containing palladium, copper and tellurium, employed for the acyloxyation is advantageously carried out as soon as the yield of the desired butenediol ester falls below an economically acceptable level.

Advantageously, the catalyst to be reactivated is treated with a solvent before being heated, in accordance with the invention, in an inert gas atmosphere. Examples of suitable solvents are the carboxylic acids with which the preceding acyloxylation has been carried out; acetic acid is particularly suitable. The catalyst to be reactivated is treated with the solvent for, for example, from 0.5 to 12 hours at from 20° to 200° C., using, for example, from 5 to 50 parts by weight of solvent per part by weight of catalyst. After this pretreatment, the catalyst is dried, for example in a stream of inert gas at from 50° to 200° C. under atmospheric pressure, or under reduced pressure.

To carry out the reactivation according to the invention, the dry catalyst is then heated in an inert gas atmosphere, for example for from 0.5 to 10 hours at from 200° to 900° C., preferably from 600° to 800° C. The inert gas used is, for example, nitrogen or argon.

Using the process according to the invention, the supported catalysts, containing palladium, copper and tellurium, which are used for the acyloxylation of butadienes to give butenediol esters can be reactivated in a technically simple and particularly effective manner.

The following abbreviations are used in the Examples:

trans-1,4-diacetoxy-but-2-ene = trans-1,4-BEDA
cis-1,4-diacetoxy-but-2-ene = cis-1,4-BEDA
3,4-diacetoxy-but-1-ene = 3,4-BEDA
3,4-hydroxyacetoxy-but-1-ene = 3,4-BEMA
The percentages are by weight.

EXAMPLE 1

(a) Preparation of the catalyst 17.9 g of copper powder are dissolved in 133 cm$^3$ of 33% strength nitric acid and the solution is mixed, at room temperature, with 16.68 g of $PdCl_2$ dissolved in 80 cm$^3$ of a warm mixture of 66% strength nitric acid and 32% strength hydrochloric acid (volume ratio 1:1), and 1.25 g of $TeO_2$ in 200 cm$^3$ of warm 16% strength hydrochloric acid. The combined metal salt solution is then added to 200 g of active charcoal (0.3–0.5 mm) which has beforehand been stirred for 5 hours with 15% strength nitric acid at 70° C. and been filtered off, washed neutral and dried under reduced pressure at 150° C. After the metal salt solution, sufficient water is added to wet the charcoal completely. The material is then evaporated to dryness on a rotary evaporator at 85° C. under a waterpump vacuum. The catalyst is dried for 2 hours at 150° C. in a vacuum drying oven and then for 2 hours at 150° C. in a tubular furnace under a stream of nitrogen. Thereafter, it is activated for 6 hours at 200° C., followed by 6 hours at 400° C., with nitrogen which has been saturated with methanol at room temperature, and finally for 0.5 hour with hydrogen (at the rate of 20 liters/hour) at 800° C. It is then allowed to cool to room temperature under a stream of nitrogen. According to elementary analysis, the catalyst contains 5.24% of palladium, 8.8% of copper and 0.53% of tellurium. X-ray analysis shows a $PdCu_3$ phase virtually devoid of PdCu.

(b) Use of the catalyst for the acetoxylation of butadiene 25 g of the catalyst prepared according to Example 1, paragraph (a) are suspended in 600 g of glacial actic acid in a 1 liter flask and the mixture is stirred thoroughly at 90°–95° C. An average of 3 liters of butadiene, 3 liters of oxygen and 200 g of glacial acetic acid are introduced per hour. The reaction product runs, via a siphon tube fitted with a frit, into collecting vessels, whose contents are weighed, and analyzed, at regular intervals.

(c) Reactivation of the catalyst

After 100 operating hours, and again after 200 operating hours, the catalyst is removed, suspended in 500 ml of glacial acetic acid, heated therein for one hour at 95° C., dried for 1.5 hours in a stream of nitrogen at 150° C., and then heated for 0.5 hour in a stream of nitrogen (at the rate of 20 liters/hour) at 800° C. The catalyst is then resuspended in 600 g of glacial acetic acid, and the acetoxylation is continued as described under (b).

After a total of 300 operating hours, analysis of the reaction product by gas chromatography shows that 1,630 g of butenediol diacetates and monoacetates have been produced. The mean molar ratio of trans-1,4-BEDA: cis-1,4-BEDA:3,4-BEDA;3,4-BEMA is 1:0.16:0.14:0.01.

EXAMPLE 2 (COMPARATIVE EXAMPLE)

The procedure described in Example 1 is followed, but the reactivation according to paragraph (c) is omitted and instead the acetoxylation is carried out uninterruptedly for 300 hours. Only 1,117 g of butenediol diacetates and monoacetates are obtained. The mean molar ratio of trans-1,4-BEDA:cis-1,4-BEDA:3,4-BEDA:3,4-BEMA is 1:0.17:0.14:0.01.

EXAMPLE 3 (COMPARATIVE EXAMPLE)

The procedure described in Example 1, paragraphs b and c, is followed, except that 25 g of a palladium-tellurium catalyst prepared according to German Patent 2,217,452 and containing 5.39% of Pd and 0.68% of Te are used. According to analysis by gas chromatography, 459 g of butenediol diacetates and monoacetates are formed in the course of 300 operating hours. The mean molar ratio of trans-1,4-BEDA:cis-1,4-BEDA:3,4-BEDA:3,4-BEMA is 1:0.13:0.13:0.01.

If this experiment is repeated, but without a reactivation in accordance with paragraph (c), 501 g of butenediol diacetates and monoacetates are obtained after 300 hours of uninterrupted acetoxylation.

We claim:

1. In a process for reactivating a supported catalyst which contains palladium, copper and tellurium and which has been used for the acyloxylation of unsubstituted or substituted butadiene to give butenediol esters, the improvement which comprises:

heating the used catalyst at from 200° to 900° C. under an essentially inert gas atmosphere, free of a reducing agent, for a period of time sufficient at said temperature to reactivate the catalyst while free of contact with any reactive gas.

2. A process as claimed in claim 1 wherein the reactivation by heating under an inert gas atmosphere is carried out at from 600° to 800° C.

3. A process as claimed in claim 1 wherein the inert atmosphere is a gas selected from the group consisting of nitrogen and argon.

4. A process as claimed in claim 1 which contains from 1 to 10% palladium, from 0.1 to 30% copper and from 0.01 to 10% tellurium, based on the weight of catalyst.

5. A process as claimed in claim 4 wherein the catalyst contains from 0.01 to 6 gram atoms of copper and from 0.01 to 0.4 gram atom of tellurium per gram atom of palladium and wherein the active catalyst contains intermetallic phases having the composition $PdCu_3$ or PdCu.

6. A process as claimed in claim 5 wherein the catalytically active metals are applied to a carrier in an amount of 0.01 to 30% by weight, based on the total weight of supported catalyst.

7. A process as claimed in claim 5 wherein the reactivation under an inert gas atmosphere is carried out at 600° to 800° C.

8. A process as claimed in claim 1 wherein the catalyst to be reactivated is pretreated with a carboxylic acid solvent in a separate step prior to heating under said inert gas atmosphere.

9. A process as claimed in claim 7 wherein the solvent pretreatment is carried out for about 0.5 to 12 hours at from 20° to 200° C., and the catalyst is then dried at from 50° to 200° C. under said inert gas atmosphere prior to said heating at a higher temperature.

10. A process as claimed in claim 8 wherein the dry catalyst is heated under an inert gas atmosphere for about 0.5 to 10 hours.

* * * * *